Inventor
William T. Barker, Jr.
by [signature]
Attorney

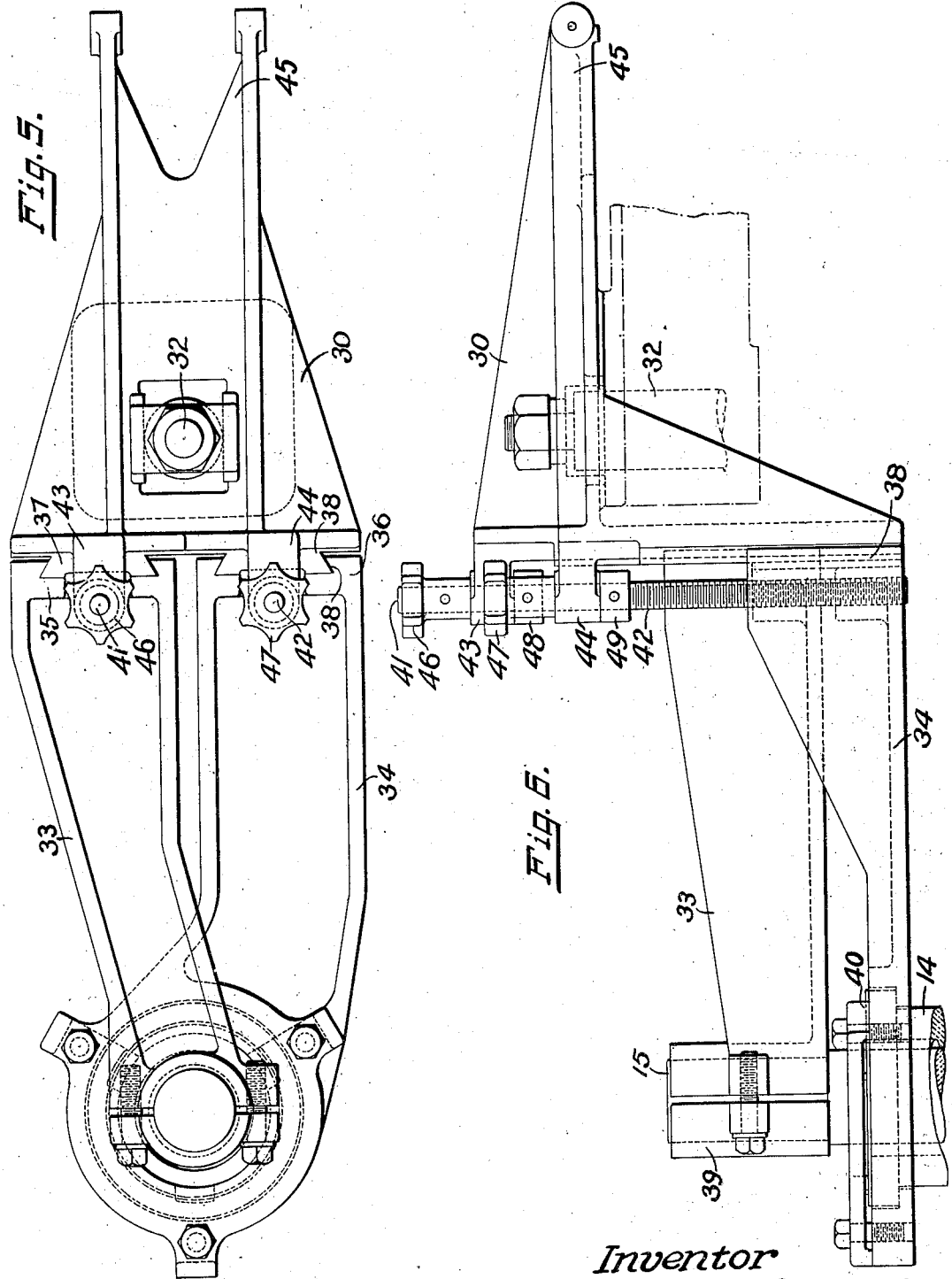

Patented Nov. 4, 1930

1,780,550

UNITED STATES PATENT OFFICE

WILLIAM T. BARKER, JR., OF HARTFORD, CONNECTICUT, ASSIGNOR TO HARTFORD-EMPIRE COMPANY, OF HARTFORD, CONNECTICUT, A CORPORATION OF CONNECTICUT

COMPOSITE PLUNGER FOR GLASS FEEDERS

Application filed March 10, 1927. Serial No. 174,194.

My invention relates to apparatus for feeding molten glass and more particularly to implements adapted to control the discharge of glass through an outlet in a container.

The principal object of the invention is to provide a composite flow-controlling plunger or implement adapted to move toward and from an outlet, and composed of a plurality of members or parts which may be adjusted relatively one to another to vary the effective shape of the lower end of the plunger and hence to vary the control exercised by the plunger upon the glass issuing from the outlet.

Another object of the invention is to provide a support for the plunger through which desired movement may be imparted thereto and provided with means by which the several parts of the composite plunger may be adjusted relatively one to the other, while the plunger is moving. Other objects of my invention will appear from the following specification and claims.

In the accompanying drawings:

Fig. 5 is a plan view showing the detailed construction of a preferred form of mounting for my composite plunger; and Fig. 6 is a side elevation of the structure of Fig. 5.

Figure 1:
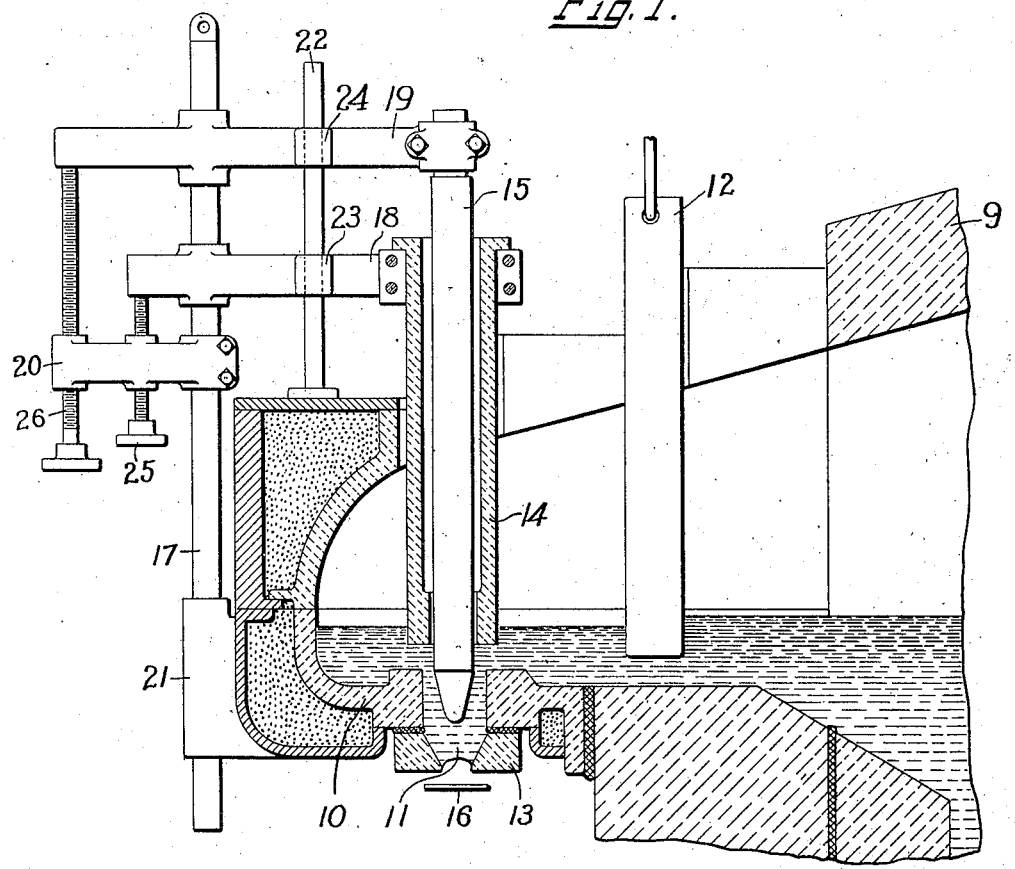
Figure 1 is a diagrammatic view in section of a glass feeding apparatus embodying my invention.

The apparatus shown in Fig. 1 illustrates a simple application of my invention. The feeder there shown comprises a forehearth or spout 10 attached to a melting furnace 9 and provided in its base with a discharge outlet 11 through which the glass is discharged under the control of a reciprocating composite plunger 14, 15. Below the outlet is diagrammatically shown a pair of shear blades 16, which may be of any suitable type adapted to periodically sever mold charges from the issuing glass in timed relation to the reciprocations of the plunger.

The discharge outlet 11 is formed in part in the floor of the forehearth and in part by an orifice ring 13, and takes the form of a well, having a curb rising slightly above the floor of the forehearth. The head of glass over the outlet is primarily controlled by a gate 12 in the forehearth between the tank and the discharge outlet, which gate may be of any suitable construction and may be controlled by any suitable means, manual or automatic, to secure the proper level in the forehearth and above the outlet.

The composite plunger comprises two members, an external tubular member or collar 14 and a core member 15 within said tubular member. The several parts of the plunger are adapted for and provided with adjustments permitting variations in the shape of the lower or working end of the plunger as a whole. The parts are so mounted as to reciprocate in unison and to act upon the glass as a single controlling unit. In Fig. 1 the core member 15 is shown as projecting well below the tubular member 14 and into the well of the outlet 11, while the tubular member is there shown as larger than the well and hence incapable of entering therein.

My invention is not limited to the particular form or proportion of these parts and includes a composite plunger of such proportions that both of its members may enter the orifice well or one in which the members are so proportioned that neither part will so enter.

The members 14 and 15 are attached respectively to arms 18 and 19 through which they are independently and slidably mounted upon a reciprocating vertical rod 17. An arm 20, rigidly attached to the rod 17 below the arms 18 and 19, is provided with upwardly directed screws 25 and 26, adapted respectively to support and to limit the downward movement of the arms 18 and 19. The arms 18 and 19 are held against the screws by their weight and that of the plunger.

Mounted on the frame work of the forehearth is a guiding rod 22 adapted to pass through guides 23 and 24 respectively in the arms 18 and 19 to preserve the proper alignment of the plunger members 14 and 15. It is evident that this arrangement of parts permits variation of the relative vertical positions of the tubular member 14 and the core member 15 by turning either of the screws 25 and 26.

The rod 17 is provided with a bearing 21 in the feeder frame and is adapted to be reciprocated by means not shown and to thus impart reciprocating movement to the plunger in suitable timed relation to the operation of the shear blades 16.

In Figures 5 and 6 I have illustrated my preferred form of plunger mounting and adjusting means adapted to vary the relative positions of the two plunger members. The mechanism there shown is particularly adapted for substitution in the now well known "Hartford single feeder," which feeder is illustrated in British Patent No. 227,078 of the Hartford-Empire Company. In these Figures 5 and 6 an arm or head 30 is mounted in any suitable manner, as for instance by a bolt and nut construction, shown on a reciprocating rod 32. An extension 45 of the head 30 is adapted for connection with guiding and adjusting mechanism such as is shown in the aforesaid British patent. As this specific guiding and adjusting mechanism forms no part of my invention it will not be here described. The head 30 is provided with a pair of keys 37 and 38 which fit respectively keyways 37' and 38' of a pair of supporting arms 33 and 34. The arm 33 is attached to the upper end of the core 15 of the composite plunger and the arm 34 is similarly attached to the tubular member 14 of the plunger. The head 30 is provided with a pair of ears 43 and 44 through which pass adjusting screw members 41 and 42 respectively. The lower portions of the screw members are threaded into threaded portions of the arms 33 and 34 respectively. The screw members are provided with hand wheels 46 and 47 and with tightening nuts 48 and 49 respectively. By this mechanism the vertical position of the arms 33 and 34 on the head 30 may be independently varied and hence the members 14 and 15 of the composite plunger may be adjusted relatively to each other. The reciprocation of the head 30 will be imparted to the composite plunger which will move in and act upon the glass as a unit. The adjustment of the parts of the plunger may readily be made while the plunger is reciprocating.

From the foregoing it will be apparent that I have provided a mechanism for controlling the discharge of glass from a glass feeder in which, through changes in the shape of the effective end of the plunger, the character of the discharges of glass may be varied over an extensive range and this while the feeder is in operation and while the effect of each change is apparent.

Figure 2:
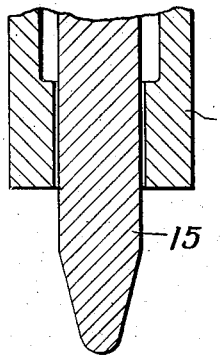
Figs. 2, 3 and 4 are sectional views of the lower portion of a composite plunger embodying my invention showing three of the many possible effective shapes which may be given to the plunger by the use of the adjustment which I provide.
Figure 3:
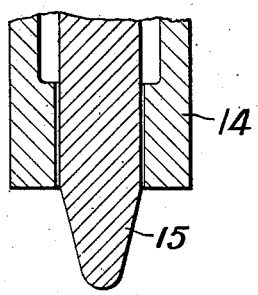
Figure 4:
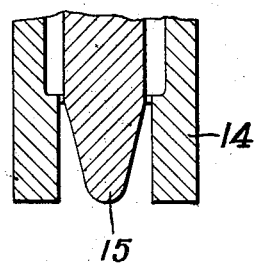

In Figures 2, 3 and 4 I have illustrated three of the numerous shapes which may be given to the lower end of the composite plunger.

In Figure 2 the core 15 projects appreciably below the tubular member thus giving the composite plunger a long slender point which may project closely to, into or through the discharge orifice to exercise a control of a particular character which is desirable in the manufacture of certain types of glassware.

In Figure 3 I have shown the core as projecting to a lesser degree below the tubular member, and the plunger, when so adjusted has many of the characteristics of a solid blunt ended plunger. With this form the shoulders formed by the tubular member being nearer the end of the plunger, may closely approach the curb of the well and when so moved will have a characteristic effect on the amount of glass passing into the well during the down stroke of the plunger.

In Figure 4 I have shown an adjustment in which the core member is withdrawn entirely within the tubular member and the plunger becomes in effect a square ended one. This form of plunger also has its peculiar effect upon the glass discharging through the orifice.

The apparatus which I have provided may be operated in numerous different ways and may be used for feeding glass either by the stream method or a modification thereof, or by the suspended-charge method. When operated to feed suspended charges it may be operated among other ways as follows:

The relative position of the core and tubular member is selected and set in view of the timing and adjustment of other portions of the feeder for the particular type of ware to be made. Gate 12 is adjusted to suitably regulate the head of glass over the outlet. When the plunger is in its upper position the glass flows by gravity through the outlet and begins the formation of a suspended mass below the orifice. The plunger then descends, expelling the glass at a more rapid rate and swelling out the charge until it has acquired substantially the size and shape suitable for the molds to be fed whereupon the plunger begins to rise and the shears sever a mold charge, which then drops freely through air into the mold or other receptacle. While the operation continues, a desired modification of the plunger shape may readily be made by turning one of the screws 25 or 26 (Figure 1), or by turning one of the hand wheels 46 and 47 (Figures 5 and 6).

The composite plunger of my invention is also useful as a means for shutting off flow of glass to the outlet, when this becomes desirable, as for instance when it is necessary to change or replace the orifice ring 13. It is obvious that by suitable movement of the adjusting screws the tubular member 14 may be seated upon the well curb and thus prevent passage of glass from the forehearth to the outlet.

It is obvious that changes may be made in structure and mode of operation without departing from the spirit and scope of my invention as defined in the appended claims.

I claim as my invention:—

1. In a glass feeder, a composite flow-controlling implement comprising a plunger provided with an adjustable collar immersed in the glass and fitting the plunger closely enough to substantially prevent passage of glass between the plunger and the collar.

2. In a glass feeder, a composite flow-controlling implement comprising a plunger provided near its lower end with a collar adapted for adjustment longitudinally of the plunger, said collar fitting the plunger closely enough to substantially prevent passage of glass between the plunger and the collar.

3. In a glass feeder, a composite flow-controlling implement comprising a plunger and a collar, and means for adjusting the plunger and collar relatively to each other, said collar fitting the plunger closely enough to substantially prevent passage of glass between the plunger and the collar.

4. In a glass feeder, a composite flow-controlling implement comprising a plunger and a collar therearound and near its lower end, and means for adjusting the plunger longitudinally relatively to the collar, said collar fitting the plunger closely enough to substantially prevent passage of glass between the plunger and the collar.

5. In a glass feeder, a flow-controlling plunger provided with a shoulder on its glass engaging portion, said plunger being formed to permit adjustment of the position of said shoulder on said plunger.

6. In a glass feeder, a flow-controlling plunger provided at its lower extremity with a reduced depending portion and a shoulder, and means for adjusting the length of such reduced depending portion.

7. In a glass feeder, a composite flow-controlling plunger comprising a tubular outer member and an inner core member adapted for adjustment longitudinally of each other, said core member fitting said tubular member to permit relative longitudinal movement of said members but to substantially prevent passage of molten glass between said members.

8. In a glass feeder, a composite flow-controlling plunger comprising a tubular outer member and an inner core member adapted for adjustment longitudinally of each other, said core member fitting said tubular member to prevent relative longitudinal movement of said members but to substantially prevent passage of molten glass between said members, and means for adjusting either the tubular member or the core member longitudinally of the other members.

9. In a glass feeder, a composite flow-controlling plunger comprising a tubular member and a core member adapted for longitudinal adjustment relative one to the other and fitted to substantially prevent any flow of glass internally of the tubular member, means for reciprocating the composite plunger, and means for adjusting the members relatively to each other while the plunger is reciprocating.

10. In a glass feeder, in combination with a container for the glass having a downwardly opening discharge outlet, a composite flow-controlling plunger comprising a core member and a tubular member the round, said members being so formed as to permit their longitudinal adjustment relatively one to the other but to substantially prevent the flow of glass internally of the tubular member, means for reciprocating the plunger to control the discharge of glass through the outlet, and means for adjusting one of said plunger members relative to the other.

11. In a glass feeder, in combination with a container for the glass having a downwardly opening discharge outlet, a composite flow-controlling plunger comprising a core member and a tubular member therearound, said members being so formed as to permit their longitudinal adjustment relatively one to the other but to substantially prevent the flow of glass internally of the tubular member, means for reciprocating the plunger to control the discharge of glass through the outlet, means for adjusting one of said plunger members relatively to the other, and severing means below the outlet periodically acting in timed relation to the movements of the plunger to sever mold charges from the discharged glass.

12. In a glass feeder, in combination with a container for the glass having a downwardly opening discharge outlet, a composite flow-controlling plunger comprising a core member and a tubular member therearound, said members being so formed as to permit their longitudinal adjustment one relatively to the other, but to substantially prevent the flow of glass internally of the tubular member, means for reciprocating the plunger to control the discharge of glass through the outlet, and means for adjusting one of said plunger members relatively to the other while the plunger is reciprocating.

13. In a glass feeder, in combination with a container for the glass having a downwardly opening discharge outlet, a composite flow-controlling plunger comprising a core member and a tubular member therearound, said members being so formed as to permit their longitudinal adjustment relatively one to the other but to substantially prevent the flow of glass internally of the tubular member, means for reciprocating the plunger to control the discharge of glass through the outlet, means for adjusting one of said plunger members relatively to the other, a severing means below the outlet periodically acting in timed relation to the movements of the plunger to sever mold charges from the discharged glass while the plunger is reciprocating.

14. In a glass feeder, in combination, a container for the glass having a downwardly opening discharge outlet, a composite discharge-controlling plunger comprising a central member having an adjustable collar, means for reciprocating the plunger, means for guiding the plunger, and means for adjusting the collar and central member longitudinally relatively one to the other to vary the effective shape of the lower end of the plunger, the lower end of the collar being adjustable to various positions substantially above the lower end of the central member, and severing means acting below the outlet in timed relation to the reciprocation of the plunger to sever mold charges from the glass discharged from the outlet.

15. In a glass feeding apparatus in combination, a container for the glass having a discharge outlet forming a well in the bottom of said container, a composite plunger adapted to move toward and from the outlet to control the issuance of glass therethrough, said plunger comprising a core member adapted to enter the well, and a tubular member closely fitting said core member and forming a shoulder therearound adapted to cooperate with the curb of the well to assist in the control of the glass discharged through the outlet, means for reciprocating the plunger, and means for adjusting one of said plunger members longitudinally of the other to vary the shape of the lower end of the plunger to vary its control of the glass.

16. In a glass feeder in combination, a container having a discharge outlet comprising a well portion having a curb immersed in the glass, a composite plunger adapted to move toward and from the outlet comprising a core portion and a tubular portion surrounding the core, said tubular portion being adapted to seat on the curb of said well when said feeder is not in operation, whereby flow of glass through the outlet is stopped, means for adjusting the tubular member toward and from the outlet, means for adjusting the core member relatively to the tubular member, and means for reciprocating the plunger.

17. In a glass feeder, a composite flow regulating implement comprising a plurality of relatively adjustable members projecting into the glass, and reciprocating in unison, said members being relatively disposed so as to substantially prevent passage of molten glass therebetween.

18. In a glass feeder, a composite flow regulating implement comprising a plurality of relatively adjustable members projecting into the glass and reciprocating in unison, and means for adjusting said members relatively to one another to vary the effective shape of the glass engaging portion of the implement, said members being continuously disposed with relation to one another to substantially prevent passage of molten glass therebetween.

19. In a glass feeder, a container having a discharge outlet, a composite flow regulating implement projecting into the glass in the container toward the outlet and comprising a core member and a tubular member, and operating and adjusting means for the implement comprising a reciprocating head, a pair of arms respectively supporting said core member and said tubular member and each mounted on the head for adjustment thereon, and means for adjusting each arm on said head independently of the other arm.

20. A glass feeder comprising an enclosure defining a channel for flowing glass from a furnace and having a discharge outlet near its outer end, a reciprocating composite discharge regulating implement comprising a plurality of members projecting into the glass in the channel toward said outlet and adapted for reciprocation in unison toward and from the outlet and for adjustment relatively to one another to vary the effective shape of said implement, said implement members being disposed with respect to one another so as to substantially prevent passage of molten glass therebetween, and a system of controls including means for regulating flow from the furnace to the outlet and means for independently adjusting said implement members, said flow regulating control means and the adjusting means for the implement members being so related as to mutually contribute to the regulable control of the discharge of glass through the outlet.

Signed at Hartford, Conn., this 4th day of March, 1927.

WILLIAM T. BARKER, JR.

CERTIFICATE OF CORRECTION.

Patent No. 1,780,550.             Granted November 4, 1930, to

WILLIAM T. BARKER, JR.

It is hereby certified that error appears in the printed specification of the above numbered patent requiring correction as follows: Page 3, line 64, claim 8, for the word "prevent" read permit, and line 69, same claim, for "members" read member; and that the said Letters Patent should be read with these corrections therein that the same may conform to the record of the case in the Patent Office.

Signed and sealed this 16th day of December, A. D. 1930.

(Seal)

M. J. Moore,
Acting Commissioner of Patents.